United States Patent

[11] 3,619,168

| [72] | Inventors | Kenneth T. Mecklenborg;<br>Kenneth H. Pettengill, both of Cincinnati, Ohio |
|---|---|---|
| [21] | Appl. No. | 655,296 |
| [22] | Filed | July 24, 1967 |
| [45] | Patented | Nov. 9, 1971 |
| [73] | Assignee | Emery Industries, Inc.<br>Cincinnati, Ohio |

[54] METHOD FOR KILLING UNDESIRABLE PLANT GROWTH
6 Claims, No Drawings

[52] U.S. Cl. .................................................... 71/106
[51] Int. Cl. ..................................................... A01n 9/24
[50] Field of Search ............................................. 71/106, 113

[56] References Cited
UNITED STATES PATENTS
3,326,664    6/1967    Tso ............................. 71/78

Primary Examiner—James O. Thomas, Jr.
Attorneys—Lewis H. Lanman and John D. Rice ABSTRACT: A post-emergence herbicidal composition is provided which comprises an emulsion containing water, a nonionic emulsifier, and an aliphatic, organic ester prepared from aliphatic monocarboxylic acids containing four to 22 carbon atoms and lower aliphatic alcohols containing one to 10 carbon atoms. The herbicides are effective in killing such weeds as mustard, foxtail, crabgrass and pigweed, and can be made selective so as to have no substantial adverse effect on certain desired crops such as beans and peanuts while being toxic to certain undesirable plants.

METHOD FOR KILLING UNDESIRABLE PLANT GROWTH

BACKGROUND OF THE INVENTION

This invention relates to a composition and method for killing weeds and other undesirable plant growth. More particularly, it relates to a postemergence herbicide which kills certain forms of plant life while being nontoxic to others.

The use of chemical herbicides in the control of plant growth has developed largely in the 20th century. The period since World War II has seen a particularly dramatic growth in the production and use of herbicides, and many diverse types of herbicidal compositions have been introduced since that time. The use of these herbicides has been of vast importance in the elimination and control of weeds in agricultural land, range land, parks and recreational areas, and the like.

Herbicides can be classified generally according to whether they are selective or nonselective, and according to whether they are applied through the air to the foliage of the plants being treated or through the soil to the roots of such plants. Selective herbicides act to kill some members of a given plant population with little or no injury to surrounding plants of certain other varieties. Such selective herbicides are particularly desirable for use in weed elimination from agricultural crops, flower gardens, and the like.

Nonselective herbicides, on the other hand, kill all plants which they contact. These nonselective compositions are used widely in reclaiming land covered by brush and undesired trees, in keeping roadsides, ditch banks, and the like free of weeds, and for eliminating plants infested with insects or plant diseases.

Most herbicides applied through the soil are "preemergence" herbicides, i.e. they destroy the unwanted plant before it emerges from the soil. If the preemergence herbicide is properly selective, it can be used to allow only desired plant growth to emerge from the soil. "postemergence" herbicides are used to eliminate plants which have already emerged from the soil. The postemergence herbicide is applied to the foliage of the plants to be destroyed.

The achievement of selectivity in postemergence herbicides is of course highly desirable. A certain degree of selectivity can be achieved by differential wetting. Thus, for example, ground weeds surrounding tall crops such as corn can often be eliminated without undue damage to the crop by ground-level spraying; however, such application is often not practical. Efficient and large-scale spraying with postemergence herbicides requires that the crops as well as the surrounding weeds be contacted with the herbicidal materials, creating a need for herbicides which can be made selective, that is, phytotoxic to undesirable plant life but having no substantial effect upon certain desired plant life. The herbicides of this invention are made selective by proper formulation of components.

Many of the diverse herbicidal compositions heretofore developed exhibit various types of selectivity and are useful in eliminating weeds from numerous specific agricultural or flower crops. A continuing search goes on for new, improved, and less costly herbicide compositions, including new herbicides having superior herbicidal activity or improved selectivity.

Accordingly, it is a primary object of the present invention to provide a new herbicidal composition which is effective in eliminating various types of undesirable plant life including crabgrass, foxtail, mustard, pigweed, and the like.

Another object of the present invention is to provide a herbicidal composition which can be used in the destruction of various types of weeds, and can be used to destroy weeds surrounding certain agricultural crops without unduly affecting the crops themselves.

Still another object of the present invention is to provide a readily available and relatively inexpensive herbicidal composition based on simple organic esters which achieve efficient herbicidal activity.

Yet another object of this invention is to provide a method for eliminating undesirable plant growth by contacting weeds and other undesirable plants with the herbicidal compositions of this invention.

Additional objects and advantages of the invention will be set forth in part in the description which follows, and in part will be obvious from the description, or may be learned by practice of the invention, the objects and advantages being realized and attained by means of the methods processes, and improvement particularly pointed out in the appended claims.

DESCRIPTION OF THE INVENTION

To achieve the foregoing objects, the present invention provides a herbicidal composition comprising an emulsion containing water, an emulsifier, and an aliphatic organic ester having the formula

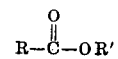

where R is an aliphatic group containing three to 21 carbon atoms, and R' is an aliphatic group containing one to 10 carbon atoms.

The invention further provides a method for killing undesirable plant growth which comprises applying to the plants a herbicidal amount of an aqueous emulsion of the above-described aliphatic organic esters, the emulsion containing an emulsifying agent in a weight ratio to said ester of between about 7:1 and 1:7.

The invention consists in the novel compositions, methods processes, steps and improvements shown and described. It is to be understood that both the foregoing general description and the following detailed description are exemplary and explanatory but are not restrictive of the invention.

The primary active ingredient of the herbicidal composition of this invention is an aliphatic organic ester having the formula:

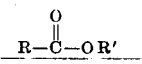

where R represents a branched or normal aliphatic radical containing three to 20 carbon atoms and R' is a branched or normal aliphatic radical containing one to 10 carbon atoms. These compounds are relatively simple, readily available, aliphatic, organic esters. Thus, herbicide compositions based on these esters can be prepared and used economically in weed control.

The ester ingredients of the herbicides of this invention are prepared by reacting at least one aliphatic monocarboxylic acid containing from four to 22 carbon atoms with one or more lower aliphatic alcohols containing from one to 10 carbon atoms. For example, acids such as butyric acid, valeric acid, caproic acid, pelargonic acid, capric acid, lauric acid, myristic acid, palmitic acid, oleic acid, stearic acid, arachidic acid and mixtures thereof can be reacted with alcohols such as methanol, ethanol, n-propanol, n-butanol, sec-butanol, 1-hexanol, 2-octanol, 2-decanol, allyl alcohol, methallyl alcohol, cyclohexanol and mixtures thereof to prepare the herbicidally active esters of this invention.

The ester component of the present herbicide is preferably prepared by reacting a $C_7$ to $C_{12}$ aliphatic monocarboxylic acid with a $C_1$ to $C_4$ lower aliphatic alcohol. Thus, preferred ingredients of the herbicidal compositions of this invention include such esters as methyl, ethyl, or n-propyl pelargonate; methyl or ethyl caprate, ethyl laurate, n-butyl or sec-butyl caprylate and the like or mixtures thereof.

The ester herbicides of this invention are prepared as concentrates comprising one or more esters of the type described above, an emulsifier and water. The concentrate is generally an invert-type emulsion prepared by adding sufficient water to predetermined amounts of the ester and the emulsifier to form a gel.

The herbicide concentrate can contain varying weight ratios of emulsifier to ester, with such weight ratios generally varying between about 7:1 and 1:7. Weight ratios outside of this range generally do not produce satisfactory emulsions. When the emulsifier is present in the herbicide concentrate in certain preferred ratios to the ester component, it has been found to exert a synergistic effect upon the toxicity of the esters to certain plant life. Weight ratios of emulsifier to ester between about 3:2 and 2:3 have been found particularly effective in this respect and hence emulsifier to ester ratios in that range are preferred.

A wide variety of emulsifiers, preferably nonionic, can be used in the herbicidal compositions of this invention. Preferred emulsifiers include polyoxyalkylated sorbitan esters, such as polyoxyalkylene derivatives of sorbitan monolaurate. These emulsifiers are sold under the trade names EMSORB and TWEEN.

The emulsifiers used in the compositions of this invention should have a hydrophilic-lipophilic balance of from about 12 to 20, and preferably between 16 and 18. The high hydrophilic emulsifier capacities of such emulsifying agents are desirable since the herbicidal concentrate is applied to weeds and the like in the form of an aqueous emulsion.

Other emulsifying agents which can be satisfactorily used in the compositions of this invention include alkyl aryl polyoxyethylene glycol ethers such as those sold under the trade name IGEPAL CO 630, alkylated aryl polyether alcohols such as those sold under the trade name TRITON X 45, long chain fatty acid esters containing multiple ether linkages, and various other emulsifiers, such as other condensation products of ethylene oxide or propylene oxide with aliphatic alcohols, amines, or carboxylic acids having long chain hydrocarbon radicals. Other examples of suitable emulsifiers for use in the herbicides of this invention include the condensation product of octadecyl alcohol with 20 to 30 mols of ethylene oxide, the condensation product of commercial oleyl amine with about 15 mols of ethylene oxide, and the like. Mixtures of more than one of such emulsifiers can also be used in the herbicidal compositions of this invention, and, certain anionic emulsifiers such as sodium petroleum sulfonate compounds and the like can be used in combination with the above-noted nonionic emulsifiers, if desired.

In use of the herbicides of this invention, the concentrate is diluted with water to form a stable aqueous emulsion which is applied directly to the weeds or other undesirable plants to be eliminated. Sufficient water is added to the concentrate to produce an emulsion having an ester concentration between about 0.05 percent and about 25 percent by weight or higher.

The optimum concentration for any particular usage depends on the particular type of plants to which the herbicide is to be applied, and on the health and age of the plants being treated. Particularly efficient aqueous herbicide emulsions of this invention have ester concentrations of about 0.1 percent to about 5.0 percent by weight, with the more concentrated emulsion being applied to hardy plants or plants which have reached peak growth.

The aqueous emulsion is normally applied as a spray, although any other conventional method of application can also be used. The spray is generally applied to the plant foliage to the "run-off" point, that is, to the point where droplets of the herbicide form and begin to run off the plant.

The herbicidal emulsions of this invention can be used for killing various types of undesirable plant life. For example, these emulsions are effective in the elimination of foxtail, crabgrass, mustard grass, pigweed, Johnson grass, barnyard grass, wild oats, field dodder, and lambsquarter.

The present herbicides shown selectivity in eliminating weeds from certain desired crops while having no significant adverse effect on the crops themselves. For example, these herbicides can be formulated so as to have substantially no adverse effect on beans and peanuts but be made effective in eliminating weeds surrounding these crops. Another advantage of the herbicides is that they are relatively nontoxic to animals including humans and thus may be safely used.

For a clearer understanding of the invention, specific examples of it are set forth below. These examples are merely illustrative and are not to be understood as limiting the scope and underlying principles of the invention in any way. All parts and percentages referred to herein are by weight unless otherwise specifically indicated.

EXAMPLES

A variety of plants and weeds were tested to determine the postemergence efficiency of the herbicide emulsions of the present invention. The plant samples for these tests were prepared by filling duplicate, porous, paper pots with vermiculite and seeding the pots with the plants used in the tests. After 10 days the test plants had reached a suitable size, and they were sprayed with the various herbicides tested. The plants were then observed for 10 days and given an injury rating by comparison with untreated controls.

The test plants were grown under artificial light with irrigation provided by placing the porous pots in a small amount of water in stainless steel trays. The postemergence herbicide applications were made to the point of runoff with a DeVilbiss atomizer operating at 5 p.s.i.

The herbicide compositions tested are set forth below. The abbreviation set forth in parentheses after each composition is used in the table below to indicate the particular ester used in each herbicide composition tested. The esters tested were:

methyl pelargonate (MP)
methyl caprate (MC)
n-propyl pelargonate (n-PP)
esters of pelargonic acid and a mixture of normal $C_8$-$C_{10}$
alcohols (n-$C_{8-10}$P)
methyl esters of a mixture of saturated and unsaturated
$C_5$-$C_{13}$ synthetic aliphatic monocarboxylic acids having an
iodine value of 8–10 (MAA)

The concentration of the ester in each test herbicide composition, the particular type of plant or weed contacted with the herbicide, and the degree and type of injury occurring to the plant contacted with the herbicide are also indicated in the table. The degree of injury is reported on a scale from 0 to 5, where:

0 = no damage
1 = slight damage
2 = moderate damage
3 = moderate to severe damage
4 = severe damage
5 = death and the kind of injury reported according to the following code:

E = epinasty
G = general necrosis
L = local necrosis
S = stunting
T = tip burn
W = wilting The emulsifier used in preparing each of the test herbicide compositions was EMSORB 6915, a polyoxyethylene sorbitan monolaurate ester containing about 20 mols of ethylene oxide per mol of ester. In each of the test compositions the weight ratio of ester to emulsifier was about 3:2.

Test plants were also treated for comparative purposes with two commercial herbicides:

2, 4D—(2,4-dichlorophenoxyacetic acid)
Atrazine—(2-chloro-4-(ethyl-6isopropylamino)-sec-triazine);
and injury ratings were taken on these plants and on untreated

TABLE.—PHOTOTOXICITY ON VARIOUS PLANTS AND WEEDS

| Ester used | Conc., wgt. percent | Molar conc. | Foxtail | Crab- grass | Mustard | Pig- weed | Corn | Snap beans | Peanuts | Johnson grass | Barn- yard grass | Wild oats | Field dodder | Lambs- quarters |
|---|---|---|---|---|---|---|---|---|---|---|---|---|---|---|
| MP | 1.72 | 0.100 | 4 WG | 5 WG | 5 WG | 5 WG | 5 WG | 1 L | | | | | | |
| MP | 0.86 | 0.050 | 2-3 WG | 3-5 WG | 3-5 WG | 4-5 WG | 5 WG | 1 L | | | | | | |
| MP | 0.43 | 0.025 | 2 G | 2 G | 1 G | 0 | 3 G | 0 | 1 L | 4 L | 4 L | 2 L | 2 G | 1 L |
| MP | 0.17 | 0.010 | 1 L | 2 L | 1 L | 1 L | 1 L | 0 | 0 | 2 LT | 2 LT | 1 L | 1 G | 0 |
| MC | 1.86 | 0.100 | 5 WG | 5 WG | 5 WG | 5 WG | 5 WG | 2 LS | 1-2 LS | 5 L | 5 WL | 2-3 WL | 4 WG | 3 W |
| MC | 0.93 | 0.050 | 3-4 WG | 4-5 WG | 4-5 WG | 5 WG | 5 WG | 1 L | 0 | 3 LT | 2 LWT | 2 L | 2 WL | 1-2 LW |
| MC | 0.46 | 0.025 | 2 G | 4 G | 1 G | 2 G | 5 G | 0 | | | | | | |
| MC | 0.19 | 0.010 | 1 L | 2 L | 2-3 WG | 1 L | 1 L | 0 | | | | | | |
| n-PP | 0.93 | 0.050 | 4 T | 4 T | 2 G | 4 G | 4 G | 1 L | | | | | | |
| n-PP | 0.46 | 0.025 | 2 L | 2 L | 0 | 0 | 2 G | 0 | | | | | | |
| n-C$_{8-10}$P | 1.40 | 0.050 | 4 T | 3 T | 1 G | 3 G | 2 L | 1 L | | | | | | |
| n-C$_{8-10}$P | 0.70 | 0.025 | 2 TG | 2 L | 1 L | 1 L | 0 | 0 | | | | | | |
| MAA | 0.84 | 0.050 | 3-4 T | 3-5 T | 3 LG | 2-3 L | 5 G | 0 | | | | | | |
| MAA | 0.42 | 0.025 | 1-2 T | 1 T | 1 LG | 1 L | 1-2 LT | 0 | | | | | | |
| Emul.[1] | 1.2 | | 1 T | 1 T | 1 L | 1 L | 0 | 0 | | | | | | |
| 2,4-D[2] | [3] 1 | | 0 | 2 S | 5 G | 5 G | 0 | 5 G | 2 E | 1 T | 1 T | 0 | 3 G | 3 W |
| Atrazine[4] | [3] 1 | | 3 G | 3 G | 5 G | 4 G | 0 | 4 G | 0 | 2 L | 3 T | 4 L | 4 G | 1 L |
| Untreated | 0 | | 0 | 0 | 0 | 0 | 0 | 0 | 0 | 0 | 0 | 0 | 0 | 0 |

[1] 1.2 wgt. percent aqueous solution of the emulsifier.
[2] 2,4-dichlorophenoxyacetic acid.
[3] Lb./acre.
[4] 2-chloro-4-(ethyl-6-isopropylamino)-sec-triazine.

control plants. The results of these tests are also reported in the table.

The results shown in the table indicate the good herbicidal activity of the present compositions against various types of weeds, and particularly against mustard, pigweed, crabgrass, foxtail, Johnson grass, and barnyard grass. The toxicity of the herbicides of this invention to these weeds is at least as good, and generally better, than the commercial 2,4-D and Atrazine herbicides. While the herbicides of this invention are toxic to corn they show only very low toxicity to snap beans and peanuts, and hence are highly effective in weed control in bean and peanut fields.

The invention in its broader aspects is not limited to the specific details shown and described; departures may be made from such details within the scope of the accompanying claims without departing from the principles of the invention and without sacrificing its chief advantages.

We claim:

1. A method for killing undesirable plant growth which comprises applying to said plant growth a herbicidal amount of an aliphatic, organic ester having the formula:

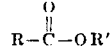

where R is an aliphatic radical containing from about six to 12 carbon atoms and R' is an aliphatic radical containing one to four carbon atoms.

2. The method of claim 1 wherein said ester is applied in the form of an aqueous emulsion.

3. The method of claim 2 wherein said emulsion contains an emulsifying agent in a weight ratio of between about 7:1 and 1:7.

4. The method of claim 2 in which the concentration of the ester in the emulsion is between about 0.05 percent and about 25 percent by weight.

5. The method of claim 4 in which the concentration of the ester in the emulsion is between about 0.1 percent and 5.0 percent by weight.

6. The method of claim 3 in which the weight ratio of emulsifier to ester is between about 3:2 and 2:3.

* * * * *